United States Patent [19]
Yu

[11] Patent Number: 5,247,428
[45] Date of Patent: Sep. 21, 1993

[54] MONOLITHIC BODY TYPE MULTIFUNCTIONAL COMPUTER WITH SLIDE OUT KEYBOARD AND HIDDEN DISK DRIVE

[76] Inventor: Ching D. Yu, No. 117, Sec 1, Ti-Hua Street, Taipei, Taiwan

[21] Appl. No.: 821,823

[22] Filed: Jan. 17, 1992

[51] Int. Cl.$^5$ .................... H05K 7/16; H05K 7/10; H05K 9/00; G06F 1/16
[52] U.S. Cl. ..................... 361/680; 361/682; 361/685; 361/816
[58] Field of Search ............... 364/708; 361/380, 390, 361/391, 392, 394, 395, 399, 424

[56] References Cited

U.S. PATENT DOCUMENTS

| | | | |
|---|---|---|---|
| 4,084,250 | 4/1978 | Albertine et al. | 364/708 |
| 4,669,053 | 5/1987 | Krenz | 364/708 |
| 5,117,378 | 5/1992 | Ho | 364/708 |

FOREIGN PATENT DOCUMENTS

| | | | |
|---|---|---|---|
| 56-32876 | 4/1981 | Japan | 361/391 |
| 58-58109 | 10/1983 | Japan | 361/391 |

*Primary Examiner*—Leo P. Picard
*Assistant Examiner*—Michael W. Phillips
*Attorney, Agent, or Firm*—Larson and Taylor

[57] ABSTRACT

The present invention relates to a novel design of a monolithic body computer, and particularly to the monolithic body computer construction which includes a computer main frame, peripheral extension interface, disk drive system and keyboard all assembled within the display unit. Wherein the display control board originally disposed under the image tube in the rear of the rear of the display unit is alternatively disposed vertically at the right side of the image tube, and the original space is used for an assembly case which can contain several assembly cassettes of boards. The assembly cassettes can receive various multifunctional computer and peripheral interface boards, so that the assembly case provides selectivity to define the computer main frame. A hidden keyboard is provided beneath the screen, and a hidden disk drive system is provided on the right side of the screen.

5 Claims, 13 Drawing Sheets

Fig. 13

MONOLITHIC BODY TYPE MULTIFUNCTIONAL COMPUTER WITH SLIDE OUT KEYBOARD AND HIDDEN DISK DRIVE

FIELD OF THE INVENTION

The present invention relates to a novel design in the construction of a monolithic body multifunctional computer.

BACKGROUND OF THE INVENTION

The computer has gradually come into wide use, and has become an indispensable instrument in our lives, jobs or education. The computer usually includes at least three parts: a computer main frame, a display unit and a keyboard. Normally, these 3 parts are traditionally provided separately so that the use of a computer usually needs the whole area of a table. Such device not only needs a lot of space, but also has an increased cost in transportation and computer assembling time. As computer development continues to progress, its application continues to widen, and the study and application of communication and multimedia and the development of the computer link network continues to mature, such that the operating space of the computer becomes smaller and smaller. The user only needs to do the input work to operate an expensive peripheral unit and data base. However, the current computer still requires a conventional device having 3 individual units and will be unusable if one of them is absent. Therefore, the selectivity available can not effectively improve the use of space, especially during the current time in which living space has been gradually decreasing and the labor costs and transportation costs gradually increasing. Thus, the design of the conventional computer apparently does not meet the needs of today.

In view of the above stated disadvantages, the inventor has endeavored in study and testing, and finally found a design of construction of a monolithic body type of multifunctional computer which can completely solve the problems produced by the abovementioned conventional computer in structure and application.

SUMMARY OF THE INVENTION

In the main structure of the present invention, the control board of the display unit is located in the rear under the image or video tube and can be removed to be disposed at the right side of the image tube as seen in the Figures. The original space thereof is occupied by an assembly case which can selectively receive various standardized computer boards and multifunctional peripheral interface boards, and which can be inserted from the rear of the case into a channel provided therein. The outside of the frame holding the boards is isolated from the image tube by a metal screen or network panel. A hidden disk drive system is disposed at the right side of the display unit, and may be revealed by operating a push button located in the front opening. A hidden keyboard system is located in front of the display unit beneath the screen.

The invention provides a computer of good selectivity and perfect function. The entire structure is light and good looking, and is convenient for transporting and storing.

The object of the present disclosure is to provide a construction of a monolithic or one-piece body, multifunctional computer, so as to simplify assembly. The construction gives a selectivity for the functions of various operations, decreases the desk space needed for support and the cost for transporting.

DETAILED DESCRIPTION OF THE PREFERRED EMBODIMENT

The invention has a monolithic or unitary body and is a multifunctional computer. It is divided into three parts: body construction; assembly case construction; and standardization of the computer boards.

1. Body construction

Figure 1:
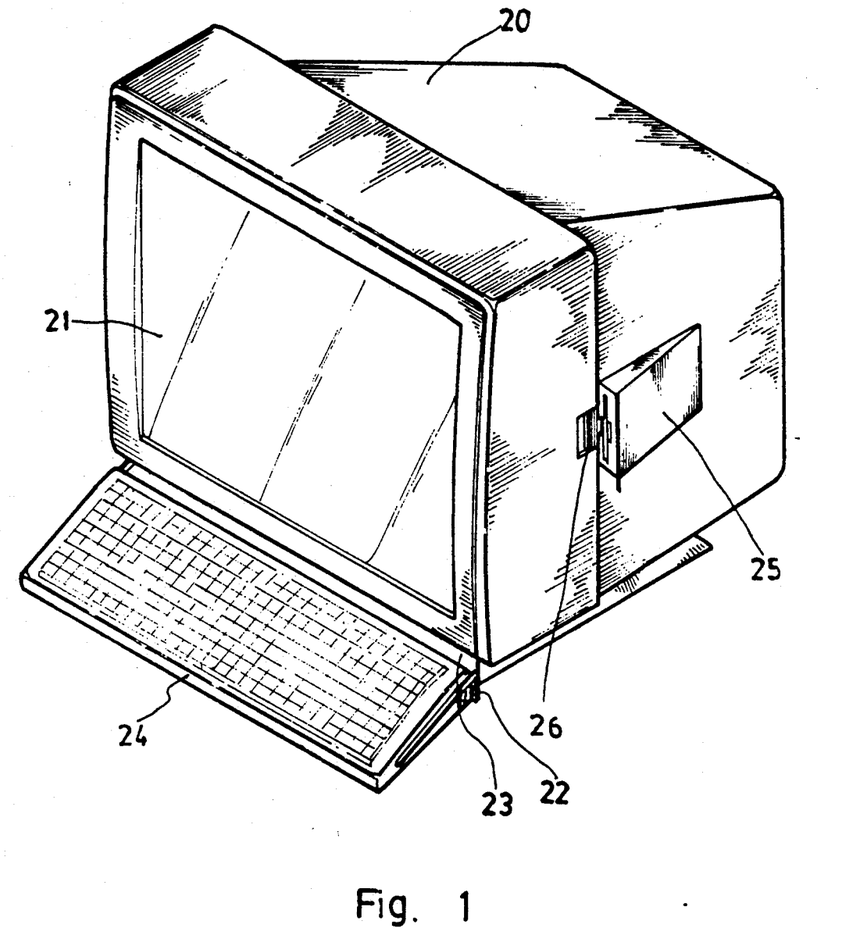
FIGS. 1 and 2 are front perspective view of the present invention depicting respectively a keyboard in a useable and stored position.
Figure 2:
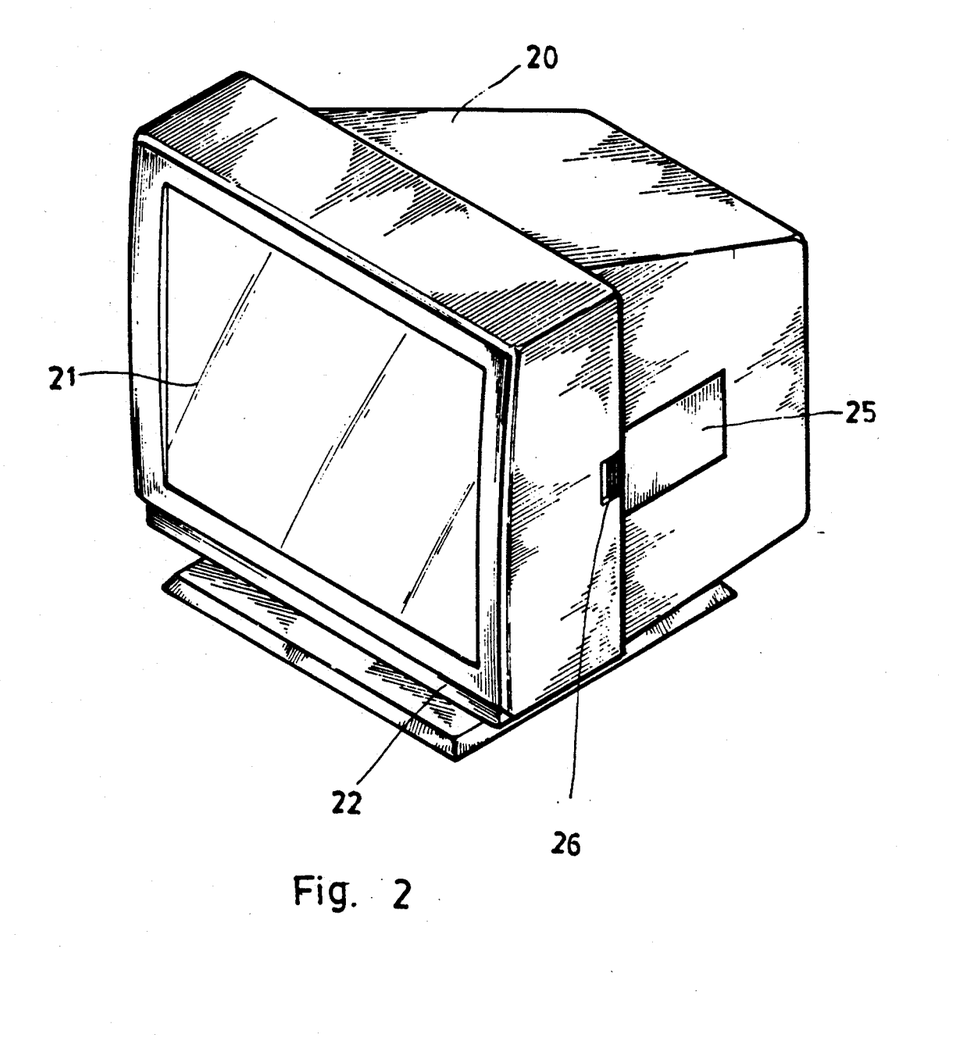
Figure 3:
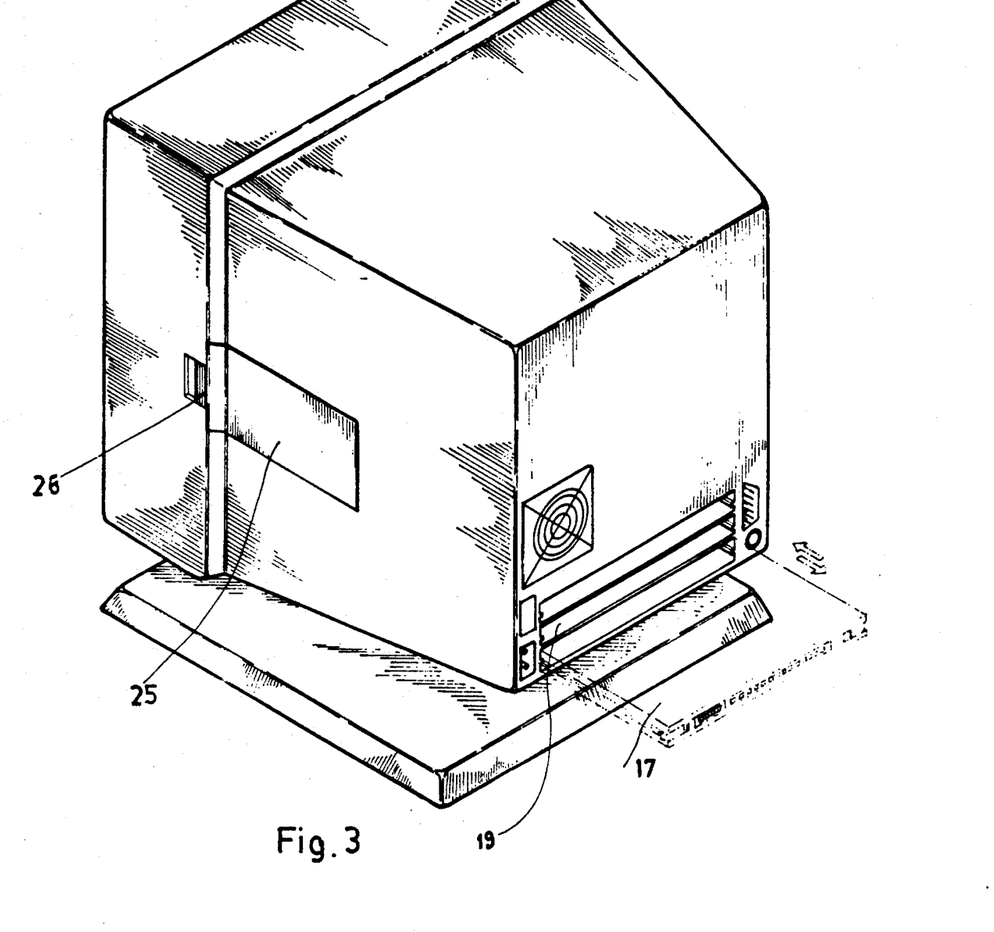
FIG. 3 is a rear perspective view.
Figure 4:
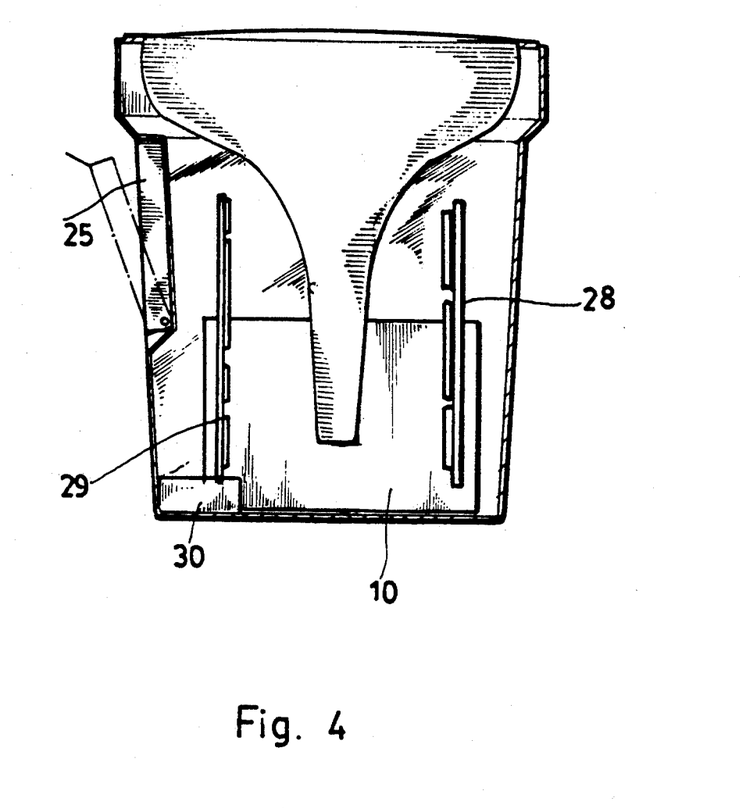
FIG. 4 is a top plan view taken in cross-section.
Figure 5:
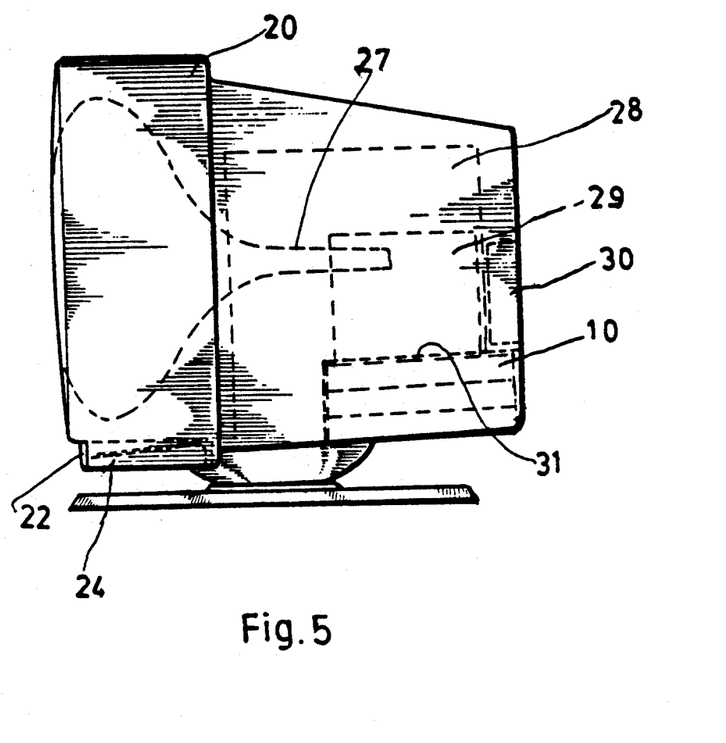
FIG. 5 is a side elevational view depicting several internal parts in phantom.

As to the housing or body construction of the present invention, please refer to FIGS. 1, 2, and 3, where a computer has a body 20, a front screen 21 and a longitudinal cover 22 provided beneath the front screen 21 of the display unit or body 20. Cover 22 has a channel 23 (see also FIG. 6) therein and is adaptable for receiving a keyboard 24 therein. FIGS. 4 and 5 depict the arrangement of boards for electrical components inside the body or housing of the display unit. A control board 28 for display unit 20 is located on the right rear side, the power supply board 29 on the left rear side, a heat dissipating fan 30 in the rear of body 20.

Figure 6:
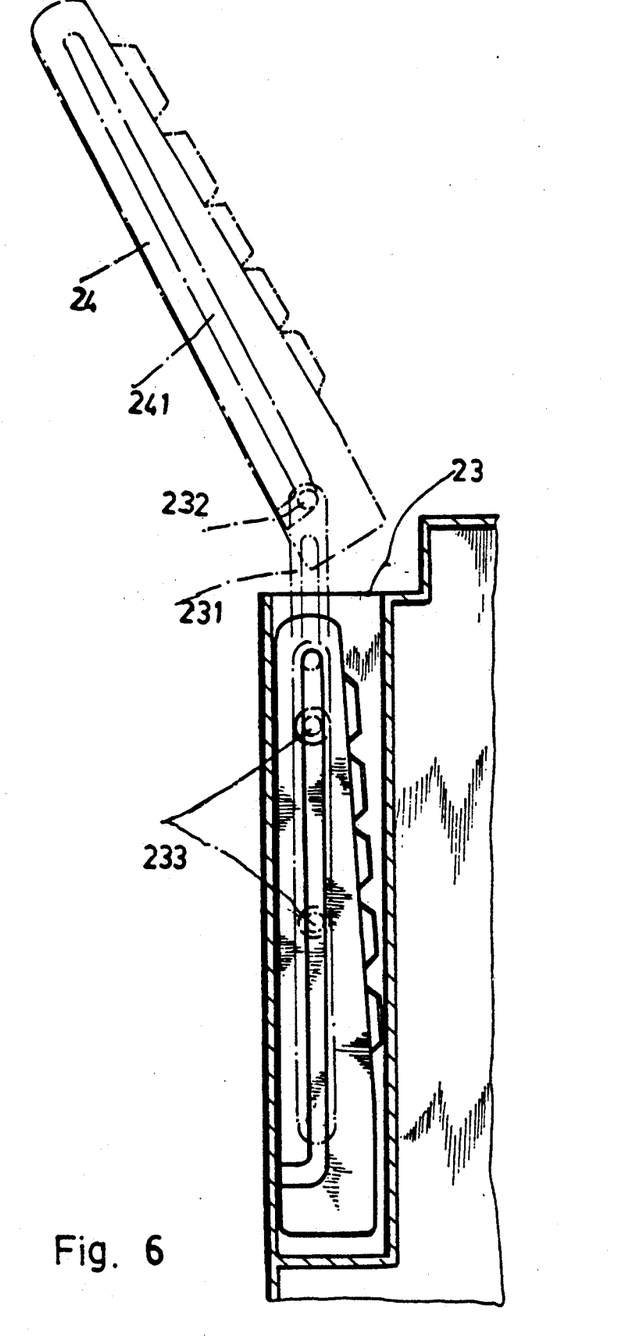
FIG. 6 is a partial side elevational view taken in cross-section depicting the stored keyboard.

There is a hidden keyboard, as shown in FIG. 6. A guide bar 231 is provided on either inner side of channel 23, and has a round hanging button 232 provided at the front end thereof. The hollow portion of guide bar 231 is used to attach guide bar 231 by two fixing buttons 233. Buttons 233 allow it to smoothly side to and fro. An L shaped groove 241 is provided on either side of keyboard 24. Two grooves 241 on the sides of keyboard 24 are used to hang keyboard 24 onto round hanging buttons 232 of guide bar 231 so that it can be pushed and pulled within channel 23.

Figure 7:
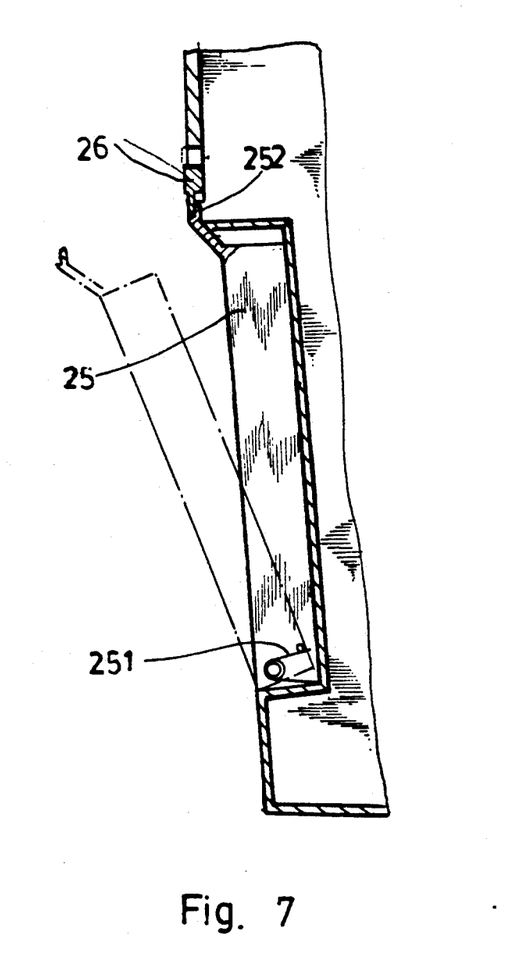
FIG. 7 is a partial top plan view taken in cross-section, depicting the disk drive.

There is a hidden disk drive system as shown in FIG. 1. An uncoverable hidden disk drive system 25 is provided on the right side of the display body 20. A lock plate 252 (as shown in FIG. 7) can be controlled by a push button 26 provided in the front end of system 25. System 25 can be pushed out automatically by the force of a spring 251 located in the rear end thereof so as to be turned on for use. System 25 needs only to be pushed back into the locked position to hide it. There is a metal shield or grid plate between system 25 and image tube 27 for isolation.

Figure 8:
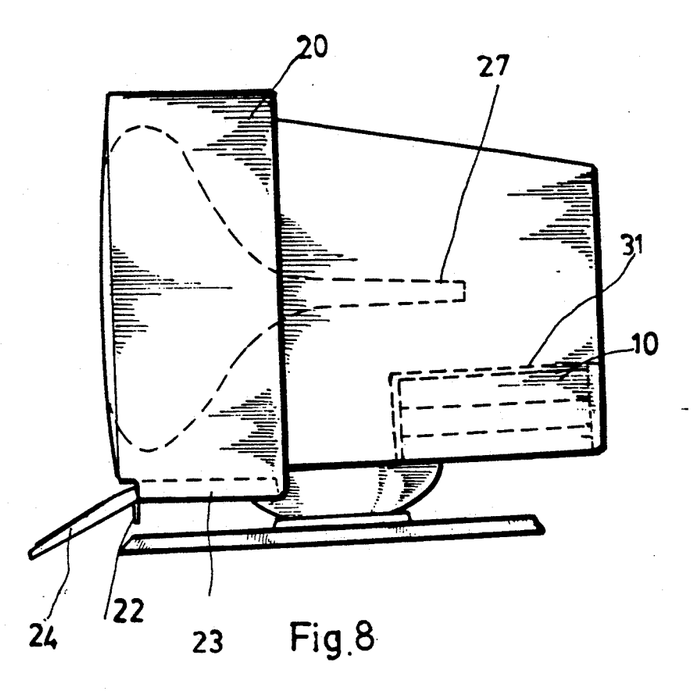
FIG. 8 is a side elevational view of the computer configuration depicted in FIG. 1 and showing the assembly case's position.
Figure 9:
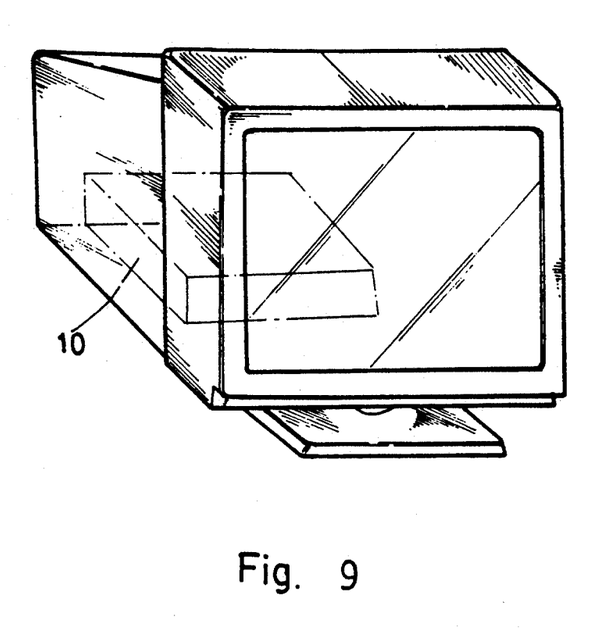
FIG. 9 is a perspective view showing the location of a circuit board assembly case.

As shown in FIG. 8, an assembly case 10 (FIGS. 10, 11) is provided under image tube 27 in the rear of the inner casing of display body 20. Case 10 is covered by a metal shield or grid plate 31, to isolate it from image tube 27. Assembly case 10, as shown in FIG. 3, has several channel openings 19 for insertion of assembly cassettes 17 of computer boards and/or peripheral interface boards. The monitor of the invention can also be connected to an AV visual communication converting circuit, and used as a TV set, or can be joined with a sound effect circuit interface, to define a multifunctional, multipurpose computer having an acoustic effect. Accordingly, the present invention is directed to a complete computer system, the whole structure thereof being light weight, having a good appearance, easily installed, and having a monolithic or one piece body that requires little space.

2. Assembly case construction

Figure 10:
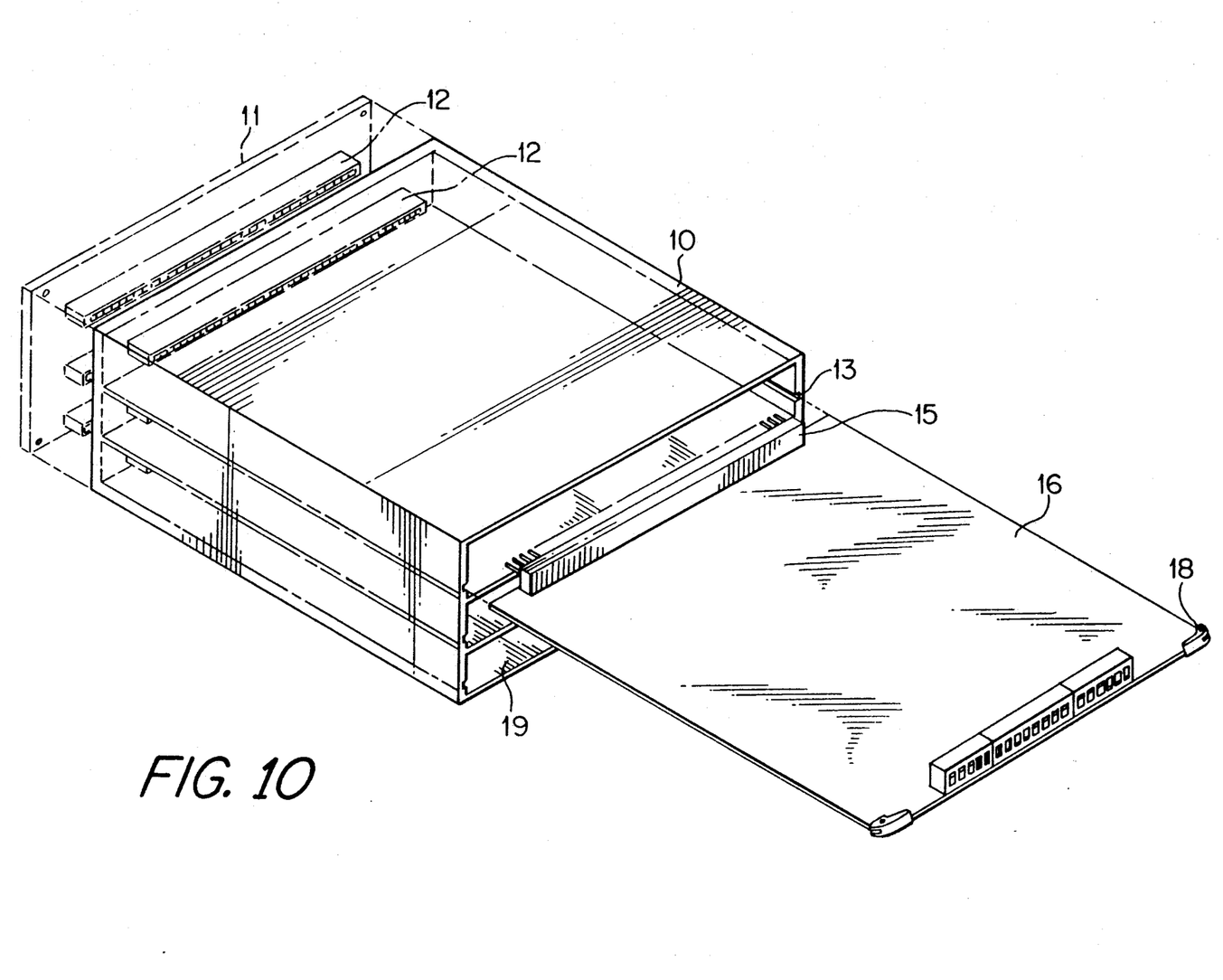
FIGS. 10 and 11 are views of the computer housing showing an assembly case with respectably a board and a cassette.
Figure 11:
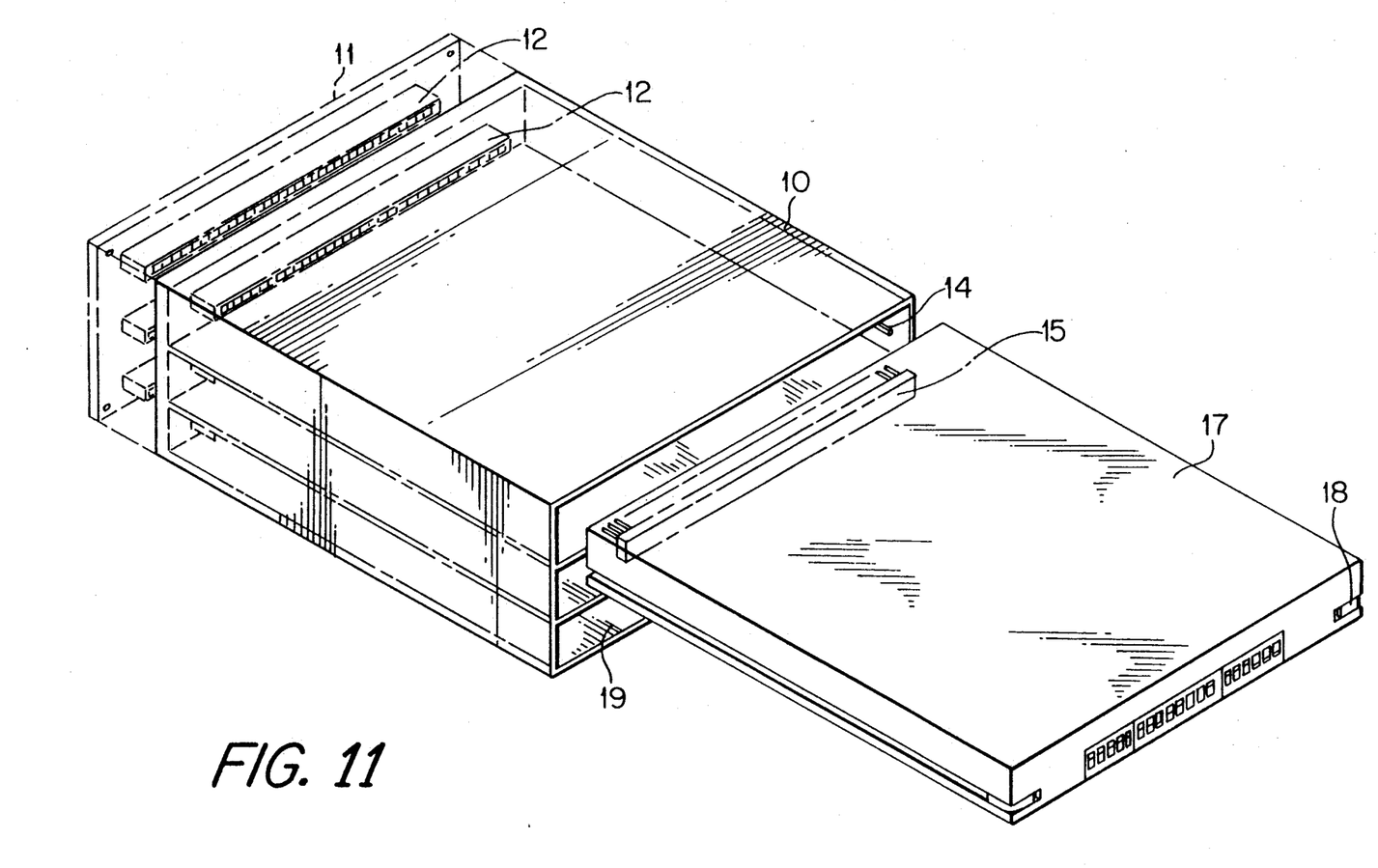

As shown in FIG. 10, a vertically installed mother board or connection seat plate 11 is provided in the rear of the assembly case 10, and has several connection seats or sockets 12 thereon. The connection among various computer boards 16 can be made through plate 11. The connecting end of every computer board has, respectively, a connector 15 which can be inserted into a connection seat 12 of connection seat plate 11 to make a connection with other computer boards. A guiding groove 13 is provided on either inner side of assembly case 10 to guide computer board 16. This completes the correct circuit connection among the boards.

Figure 13:
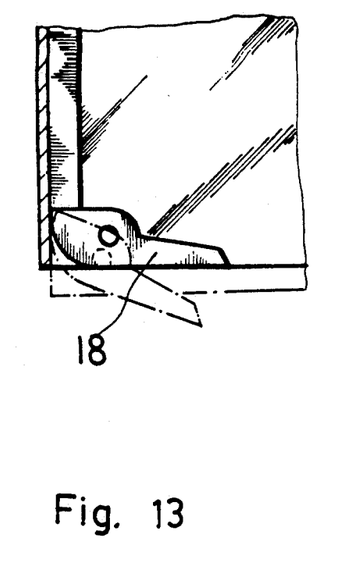
FIG. 13 is a side elevational view of the assembly board pusher lever.

The front end of computer boards 16 is provided with two swivel pusher levers 18, which need only to be swiveled outwardly (FIG. 13) to push the board out of its corresponding connection seat 12 for easy removal. Alternatively, a computer board 16 may be fitted into an assembly cassette, such as the assembly cassette 17 in FIG. 11. Cassette 11 may be pushed into case 10 using the guide provided by guiding grooves 14, and can connect with connection seat plate 11, so as to quickly complete the installation of the main frame.

3. Standardization of the computer boards

Figure 12:
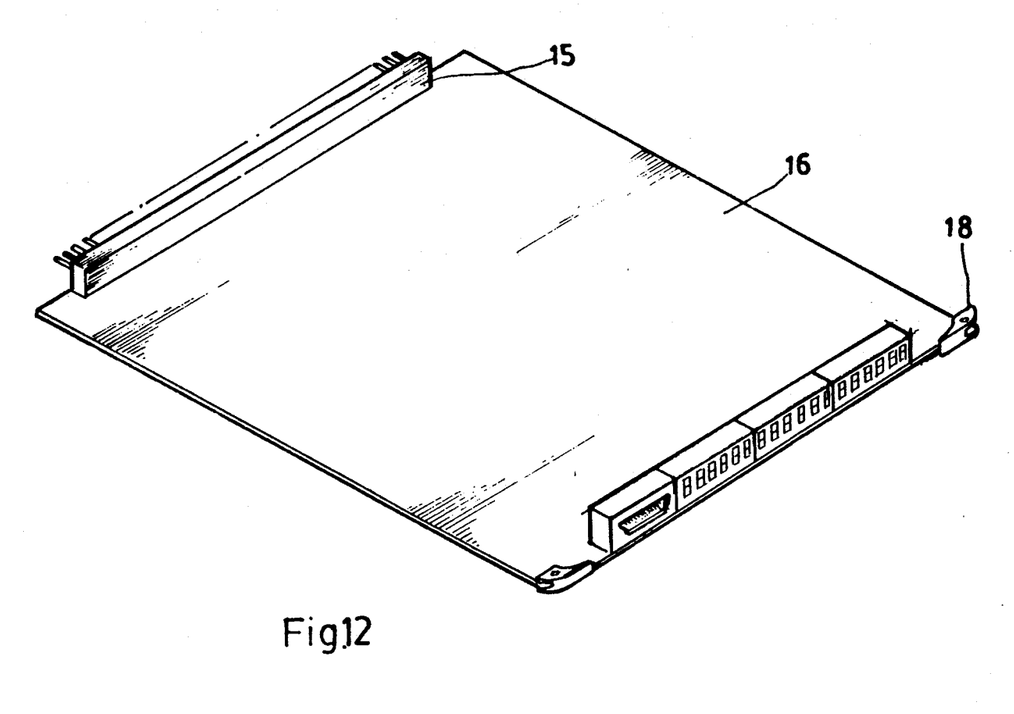
FIG. 12 is a perspective view of an assembly board.

Because of the limitations in chip production techniques in the earlier days, computer or peripheral boards needed considerable dimensions. The development of chip science and techniques nowadays has already allowed the computer and the peripheral equipment to be fitted into a note book size space. Even smaller, there are hand held computers in the market. According to the current functions of the computer mother board and the peripheral interface cards using the modern multifunctional chips, the computer board has been standardized into several kinds as depicted in FIG. 12. Assembly boards 16, which all have the same dimensions, are provided with a connector 15 to connect with the circuit. At both sides of board 16 on the front end thereof there is provided swivel pusher levers 18. The standardization of the computer boards is specified as follows:

(1) Central processor card (CPU CARD)

This is comprised of the CPU itself and a secondary processor, chips with the BIOS, control chips, module memory socket and the clock circuits for the board's operation. Different processors have different boards, such as an 80286 CPU card, 80386SX CPU card, 80386DX CPU card, etc.

(2) Standard peripheral sound interface card (I/O CARD)

This is comprised of a keyboard chip and connector, a standby battery, a monochromatic or color display unit interface, a parallel port and two serial ports, network interface and disk interface.

(3) Communication interface card (DATA I/O CARD)

This is a remote communication link system, and is comprised of modem chips and a FAX chip for line interface.

(4) Multimedia interface card

This is comprised of an AV visual communication chip circuit interface, and a sound effect circuit interface.

(5) External connection extension switching card

A switching board for the normally used extension channel and connector is provided for use with conventional interface cards on the markets, i.e., the current interface card is fitted into the assembly case directly, or is externally connected in an extension mode, so as to make the line switching connection by the connection seat plate through the switching board of the connector.

The features of the present invention include:

1. The amount of space needed to hold the computer of the present invention is smaller, which increases the availability of space.

2. As to the cost of transportation, the volume of the present invention for transportation is the size of a conventional display unit; this makes the transportation costs cheaper.

3. As to the ease of assembling and disassembling, the present invention is a better one. One needs only to detach the interface board from assembly case 10, and to insert the substituting interface board directly into the case. It is easy, and can also save time and effort.

4. As to the extension feature of its function, the present invention is available to exchange the extension interface to increase its functions. If an AV visual communication interface is chosen, it is possible to receive TV programs; if a sound interface is chosen, it is possible to increase the acoustic effect; if a modem is chosen, it is possible to have remote communication link functions; if the Fax interface (FAX CARD) is chosen, it is possible to use its memory, as a Fax machine without a paper receiving function.

5. As to the convenience in operation, the present invention allows disk drive system 25 to be opened simply by pressing a push button 26, and it allows keyboard 24 to be simply pulled out for use. When not in use, disk driver system 25 may be pushed back in position, and keyboard 24 pushed back into channel 23, thereby occupying very little space. Also there is no problem from contamination by dirt etc., and it makes the operation thereof easier and it simplifies cleaning.

6. As to maintenance or testing, one needs only to pull out the boards in question and exchange them with another one. This is very convenient and quick, unlike the current computers where one must first detach all the interface boards one by one from the mother board.

7. As for the safety of the present invention, one needs only to swivel the swivel push levers 18 outwardly so as to detach and remove boards, unlike the current computer main frames which need a complicated process and which can cause injury from the parts on the boards. Thus, the present invention can certainly increase safety in removal and assembly.

Accordingly, the present invention provides a construction with excellent integrity, has the advantage of easy assembly, moving, disposing and transportation. The present invention provides an advantageous solution to the social problem of having less and less room for living and having gradually increasing labor costs. The present invention has a practical reality. There is no similar device publicized in advance. The applicant thereby makes claims here-in-after under the protection of the patent law.

What is claimed is:

1. A monolithic computer system comprising
   a one piece housing having an elongated channel in the front side thereof and a hidden disk drive system receiving device in a side of said housing;
   a display in said housing and including a cathode ray tube and having a screen in the front side of said housing, said screen being located above said channel;
   a keyboard hidden in said channel and removable therefrom when being used;
   an assembly case for receiving computer boards located in the rear of said housing under said cathode ray tube and including a metal shield for isolation therefrom; and
   a disk drive system mounted in said receiving device such that said drive system can be open for use.

2. A computer system as claimed in claim 1 wherein said housing further includes a hidden keyboard receiving device which comprises a cover covering said elongated channel, two moving guide bars having round hanging buttons provided in both inner sides thereof; and
   wherein said keyboard has an L-shaped groove on each side thereof, said hanging buttons being connected thereto so as to permit said keyboard to be inserted into and withdrawn out of said channel.

3. A computer system as claimed in claim 1 wherein said assembly case includes:
   a connection seat plate on the rear end thereof, said set plate having several connection seats thereon;
   a plurality of channels equal in number to the number of connection seats, said channels having guide grooves on each side thereof such that an assembly cassette fitted with an electronic board can be selectively inserted into said case channels, so as to define the main frame of said computer.

4. A computer system as claimed in claim 3 wherein said assembly cassette comprises two swivel pusher levers which are operable to push said assembly cassette off said connection seat on said seat plate by swiveling outwardly and thereby permitting the easy removal of said assembly cassette from said case.

5. A computer system as claimed in claim 1 wherein said hidden disk drive system receiving device includes a push button controlled lock plate which is mounted to said housing so as to allow said disk drive to move out to an open position for use upon activation of said button, and a spring connected to said lock plate to urge said plate to an open position.

* * * * *